(12) United States Patent
Gore et al.

(10) Patent No.: US 11,922,159 B2
(45) Date of Patent: Mar. 5, 2024

(54) SYSTEMS AND METHODS FOR CLONING FIRMWARE UPDATES FROM EXISTING CLUSTER FOR CLUSTER EXPANSION

(71) Applicant: Dell Products L.P., Round Rock, TX (US)

(72) Inventors: Santosh Gore, Bangalore (IN); Karthik Sethuramalingam, Bangalore (IN); Riddhiman Bhattacharyya, Kolkata (IN)

(73) Assignee: Dell Products L.P., Round Rock, TX (US)

( * ) Notice: Subject to any disclaimer, the term of this patent is extended or adjusted under 35 U.S.C. 154(b) by 106 days.

(21) Appl. No.: 17/576,620

(22) Filed: Jan. 14, 2022

(65) Prior Publication Data
US 2023/0229414 A1 Jul. 20, 2023

(51) Int. Cl.
*G06F 21/57* (2013.01)
*G06F 8/61* (2018.01)
*G06F 8/65* (2018.01)
*H04L 41/344* (2022.01)

(52) U.S. Cl.
CPC .................. *G06F 8/65* (2013.01); *G06F 8/63* (2013.01); *G06F 21/572* (2013.01); *H04L 41/344* (2022.05)

(58) Field of Classification Search
CPC . G06F 8/65; G06F 21/572; G06F 8/63; H04L 41/344
See application file for complete search history.

(56) References Cited

U.S. PATENT DOCUMENTS

| 2004/0205779 A1* | 10/2004 | Almeida ................. H04L 67/34 719/321 |
| 2007/0168498 A1* | 7/2007 | Lambert ............... H04L 41/344 709/224 |
| 2008/0028385 A1* | 1/2008 | Brown ..................... G06F 8/65 717/170 |

(Continued)

OTHER PUBLICATIONS

G. Pruett et al., BladeCenter systems management, Nov. 2005, [Retrieved on Nov. 15, 2023]. Retrieved from the internet: <URL: https://ieeexplore.ieee.org/stamp/stamp.jsp?tp=&arnumber=5388766> 13 Pages (963-975) (Year: 2005).*

(Continued)

*Primary Examiner* — Anibal Rivera
(74) *Attorney, Agent, or Firm* — Jackson Walker L.L.P.

(57) ABSTRACT

An information handling system may include a processor and a management controller communicatively coupled to the processor and configured to perform out-of-band management of the information handling system, the management controller further configured to, in response to a request from a management utility remote from the information handling system to create a firmware image for an item of firmware for a cluster comprising the information handling system retrieve a firmware update package, store the firmware update package in a repository integral to the management controller, and communicate a uniform resource locator to the management utility setting forth a path of the firmware update package within the repository, such that the management utility may later use the uniform resource locator to perform a firmware update for another information handling system of the cluster.

18 Claims, 6 Drawing Sheets

(56) References Cited

U.S. PATENT DOCUMENTS

| | | | | |
|---|---|---|---|---|
| 2009/0254897 | A1* | 10/2009 | Segalov | G06F 8/658 |
| | | | | 717/173 |
| 2010/0070619 | A1* | 3/2010 | Chaganti | G06F 8/656 |
| | | | | 709/222 |
| 2010/0313191 | A1* | 12/2010 | Yin | G06F 8/65 |
| | | | | 711/E12.001 |
| 2017/0006410 | A1* | 1/2017 | Barrett | H04W 4/023 |
| 2017/0046152 | A1* | 2/2017 | Shih | G06F 11/0727 |
| 2018/0173516 | A1* | 6/2018 | Tung | G06F 8/654 |
| 2020/0026505 | A1* | 1/2020 | Olderdissen | G06F 9/44526 |
| 2020/0348946 | A1* | 11/2020 | Pant | G06F 11/1417 |

OTHER PUBLICATIONS

Cenk Gundogan et al., Reliable Firmware Updates for the Information-Centric Internet of Things, Sep. 22-24, 2021, [Retrieved on Nov. 15, 2023]. Retrieved from the internet: <URL: https://dl.acm.org/doi/pdf/10.1145/3460417.3482974> 12 Pages (59-70) (Year: 2021).*

* cited by examiner

SYSTEMS AND METHODS FOR CLONING FIRMWARE UPDATES FROM EXISTING CLUSTER FOR CLUSTER EXPANSION

TECHNICAL FIELD

The present disclosure relates in general to information handling systems, and more particularly to methods and systems for cloning firmware updates from an existing cluster of information handling systems for cluster expansion.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In an environment of multiple information handling systems, which may be referred to as a "cluster," maintaining homogeneity (in terms of both hardware configuration and firmware components) among information handling systems (which may be referred as a "nodes") in the cluster is often recommended to maintain stability, performance, and resiliency of the cluster.

For firmware and components of a basic input/output system (BIOS), administrators of clusters may create an approved baseline (e.g., catalog) for each cluster and update all nodes with the baseline. During cluster expansion, an administrator may use the same baseline to updated new nodes to maintain homogeneity of the cluster.

However, existing approaches for applying a baseline to new nodes have numerous disadvantages. For example, an administrator may tune firmware updates based on their workload needs. Thus, the administrator may only choose firmware components relevant to the workload needs even though a catalog may suggest installation of all firmware components. In addition, in enterprises including many clusters outside of a datacenter (e.g., many factories, manufacturing hubs, edge locations, etc.), administrators often prefer to use the latest online catalogs of firmware while creating a cluster, and maintaining a local firmware baseline for each cluster may be costly.

When expanding a cluster to add new nodes, administrators often prefer not to disturb the working cluster, but bring the new nodes on par with the existing nodes to maintain homogeneous firmware versions. However, such is not possible with existing approaches, as the existing nodes may be out of sync with an online baseline. Often, either the online baseline may be too old or the current cluster is not in compliance with an online catalog. Thus, using existing approaches, an administrator may be forced to take the existing cluster offline for maintenance to perform updates before adding the new nodes.

SUMMARY

In accordance with the teachings of the present disclosure, the disadvantages and problems associated with cluster expansion may be reduced or eliminated.

In accordance with embodiments of the present disclosure, an information handling system may include a processor and a management controller communicatively coupled to the processor and configured to perform out-of-band management of the information handling system, the management controller further configured to, in response to a request from a management utility remote from the information handling system to create a firmware image for an item of firmware for a cluster comprising the information handling system retrieve a firmware update package, store the firmware update package in a repository integral to the management controller, and communicate a uniform resource locator to the management utility setting forth a path of the firmware update package within the repository, such that the management utility may later use the uniform resource locator to perform a firmware update for another information handling system of the cluster.

In accordance with these and other embodiments of the present disclosure, a method may include, in response to a request from a management utility remote from the information handling system to a management controller configured to perform out-of-band management of an information handling system, to create a firmware image for an item of firmware for a cluster comprising the information handling system: retrieving, by the management controller, a firmware update package; storing, by the management controller, the firmware update package in a repository integral to the management controller; and communicating, by the management controller, a uniform resource locator to the management utility setting forth a path of the firmware update package within the repository, such that the management utility may later use the uniform resource locator to perform a firmware update for another information handling system of the cluster.

In accordance with these and other embodiments of the present disclosure, an article of manufacture may include a non-transitory computer-readable medium and computer-executable instructions carried on the computer-readable medium, the instructions readable by the processor, the instructions, when read and executed, for causing the processor to, by a management controller configured to perform out-of-band management of an information handling system, in response to a request from a management utility remote from the information handling system to the management controller to create a firmware image for an item of firmware for a cluster comprising the information handling system: retrieve a firmware update package; store the firmware update package in a repository integral to the management controller; and communicate a uniform resource locator to the management utility setting forth a path of the firmware update package within the repository, such that the management utility may later use the uniform resource locator to perform a firmware update for another information handling system of the cluster.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 6, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
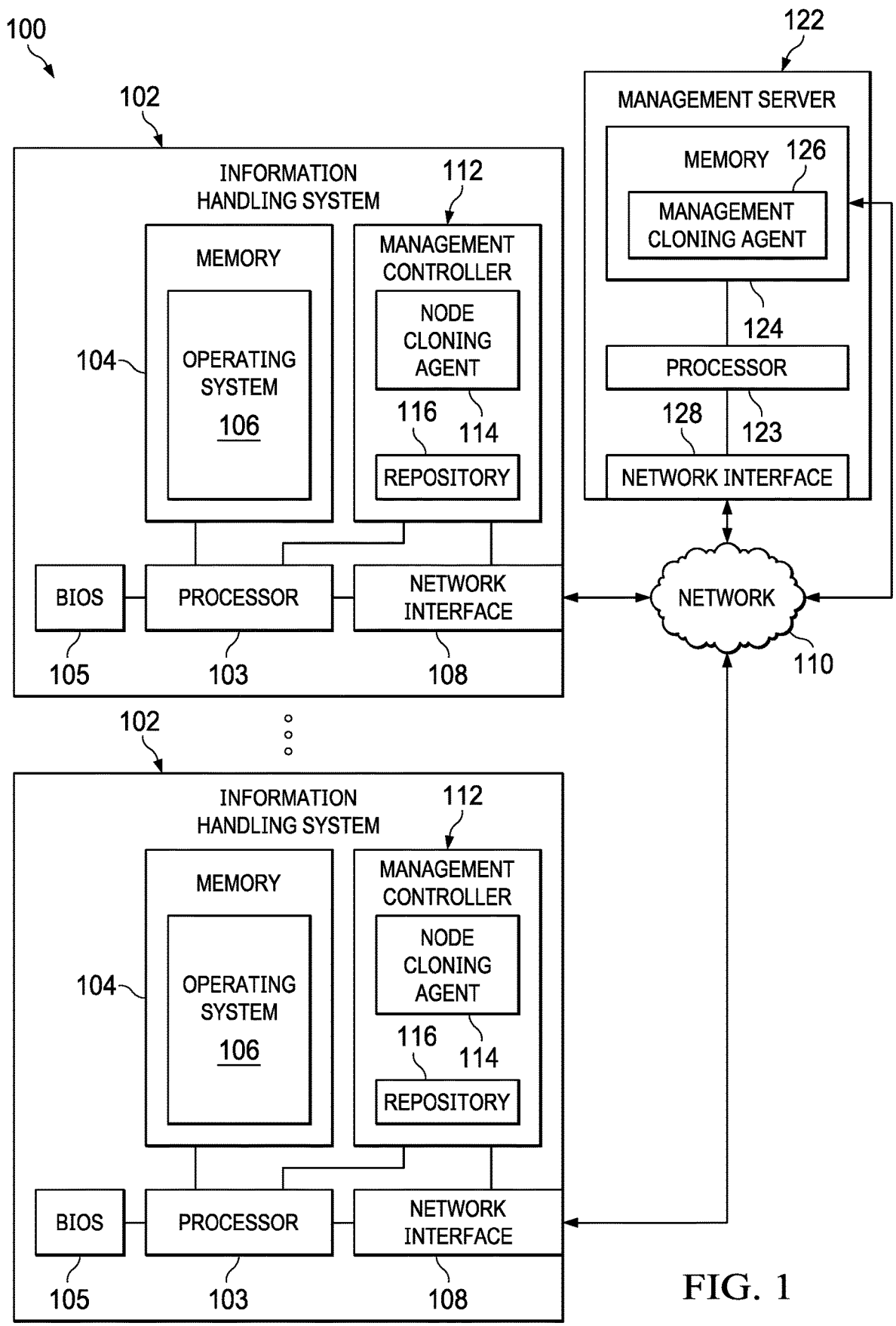
FIG. 1 illustrates a block diagram of an example system for cloning firmware updates from an existing cluster for cluster expansion, in accordance with embodiments of the present disclosure.

FIG. 1 illustrates a block diagram of an example system for cloning firmware updates from an existing cluster for cluster expansion, in accordance with embodiments of the present disclosure. As shown in FIG. 1, system 100 may include a plurality of information handling systems 102, a network 110, and a management server 122. The plurality of information handling systems 102 may be considered a "cluster," and each individual information handling system 102 may be considered a "node" in such cluster.

In some embodiments, an information handling system 102 may comprise a personal computer. In some embodiments, an information handling system 102 may comprise or be an integral part of a server. In other embodiments, an information handling system 102 may comprise a portable information handling system (e.g., a laptop or notebook, etc.). As depicted in FIG. 1, an information handling system 102 may include a processor 103, a memory 104 communicatively coupled to processor 103, a BIOS 105 communicatively coupled to processor 103, a network interface 108 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card. Network interface 108 may be configured to communicate via wire-line transmissions, wireless transmission, or both.

Management controller 112 may be configured to provide out-of-band management facilities for management of information handling system 102. Such management may be made by management controller 112 even if information handling system 102 is powered off or powered to a standby state. Accordingly, in some embodiments, such management may be made through a dedicated management communications channel which may be physically and/or logically isolated from an "in-band" communications channel used by a host system of information handling system 102 when powered on. In certain embodiments, management controller 112 may include or may be an integral part of a baseboard management controller (BMC), a remote access controller (e.g., a Dell Remote Access Controller of Integrated Dell Remote Access Controller), or an enclosure controller. In other embodiments, management controller 112 may include or may be an integral part of a chassis management controller (CMC). As shown in FIG. 1, management controller 112 may comprise node cloning agent 114 and repository 116.

Node cloning agent 114 may comprise a program of instructions embodied on computer-readable media integral to or otherwise accessible to management controller 112, and may be configured to, when executed and in concert with management cloning agent 126 of management server 122, clone (if available) firmware packages present within management controller 112 or otherwise present within information handling system 102, and generate repository 116 for storing firmware baselines for updating other nodes in the cluster of system 100 and/or deploying firmware to new nodes added to the cluster of system 100, as described in greater detail below.

Repository 116 may comprise computer-readable media integral to or otherwise accessible to management controller 112 and configured to store firmware baselines for updating other nodes in the cluster of system 100 and/or deploying firmware to new nodes added to the cluster of system 100, as described in greater detail below.

In addition to processor 103, memory 104, BIOS 105, network interface 108, and management controller 112, information handling system 102 may include one or more other information handling resources.

Network 110 may be a network and/or fabric configured to couple information handling system 102, management server 122, and/or one or more other information handling systems to one another. In these and other embodiments, network 110 may include a communication infrastructure, which provides physical connections, and a management layer, which organizes the physical connections and information handling systems communicatively coupled to network 110. Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 110 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Management server 122 may comprise any information handling system including requisite hardware, software, and/or firmware for interfacing information handling system 102 via network 110 in order to perform end-to-end workload modeling, as described in greater detail below.

As depicted in FIG. 1, management server 122 may include a processor 123, a memory 124 communicatively coupled to processor 123, and a network interface 128 communicatively coupled to processor 123.

Processor 123 may include any system, device, or apparatus configured to interpret and/or execute program instructions and/or process data, and may include, without limitation a microprocessor, microcontroller, DSP, ASIC, or any other digital or analog circuitry configured to interpret and/or execute program instructions and/or process data. In some embodiments, processor 123 may interpret and/or execute program instructions and/or process data stored in memory 124 and/or another component of management server 122.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to management server 122 is turned off.

As shown in FIG. 1, memory 124 may have a management cloning agent 126 stored thereon. Management cloning agent 126 may comprise any suitable program of instructions configured to, when loaded by processor 123 from memory 124, in concert with a node cloning agent 114 of an information handling system 102, clone (if available) firmware packages present within management controller 112 or otherwise present within information handling system 102, and generate repository 116 for storing firmware baselines for updating other nodes in the cluster of system 100 and/or deploying firmware to new nodes added to the cluster of system 100, as described in greater detail below.

Network interface 128 may comprise any suitable system, apparatus, or device operable to serve as an interface between management server 122 and network 110. Network interface 128 may enable management server 122 to communicate using any suitable transmission protocol and/or standard, including any of the protocols and/or standards described above with respect to network 110. In these and other embodiments, network interface 128 may comprise a NIC.

In addition to information handling system 102, network 110, and management server 122, system 100 may include one or more other information handling resources.

In operation, management cloning agent 126 may, via network interface 128 and network 110, perform data collection in order to retrieve hardware information (e.g., information regarding processors, memory, storage, network interfaces, peripheral devices, cryptographic processors, graphics processors, and BIOS capabilities) from information handling systems 102. After collecting such hardware information, management cloning agent 126 may analyze such information to determine a recommended purpose of each information handling system 102, and may also determine a ranking of recommended purposes of each information handling system. Management cloning agent 126 may further communicate such determined recommended purpose and determined ranking to a user (e.g., administrator or information technology technician) to allow a user to choose the purpose of each information handling system 102, which may thus define the type of processing workload each information handling system 102 will handle. Management cloning agent 126 may also, for each ranked recommended purpose, generate a recommended configuration profile associated with such ranked recommended purpose, which may be based on vendor recommendations for each information handling system 102 or its components. Accordingly, the user may be enabled to, based on hardware configurations of each information handling system 102, select a purpose for each such information handling system 102 and apply configuration settings for each information handling system 102 related to its selected purpose. Such configurations may then be applied to one or more information handling systems 102 via any suitable device management console.

Figure 2:
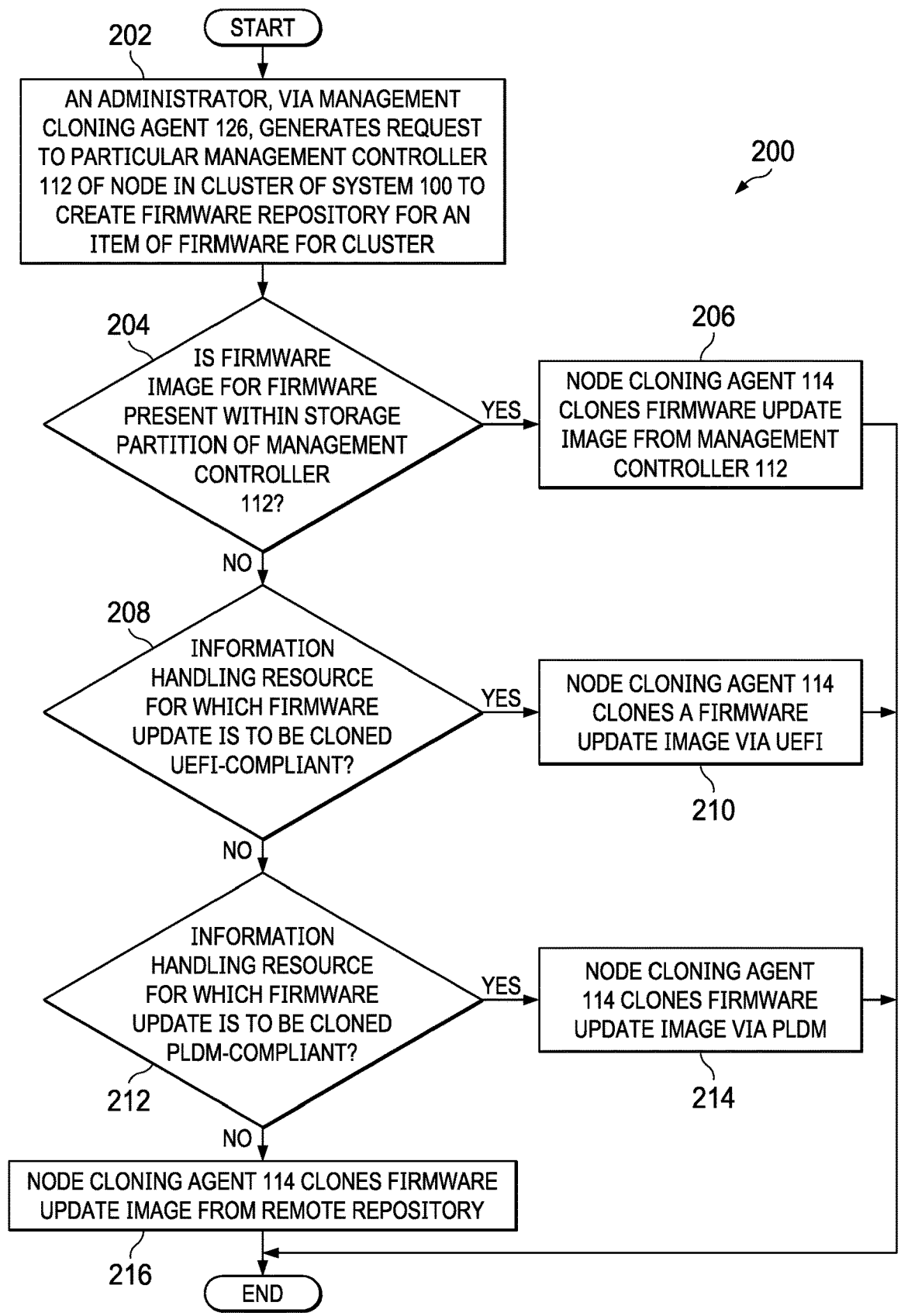
FIG. 2 illustrates a flowchart of an example method for cloning firmware updates from a node of a cluster, in accordance with embodiments of the present disclosure.

FIG. 2 illustrates a flowchart of an example method 200 for cloning firmware updates from a node of a cluster, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, an administrator, via management cloning agent 126, may generate a request to a particular management controller 112 of a node in the cluster of system 100 to create a firmware repository for an item of firmware for the cluster. Such firmware may be any firmware associated with the nodes of the cluster, including without limitation BIOS firmware or firmware for an information handling resource of the nodes. The particular management controller 112 selected by the administrator may be one residing in a node which includes all required firmware updates for nodes of the cluster.

At step 204, in response to the request, node cloning agent 114 may determine if a firmware image for the firmware is present within a storage partition of the management controller 112 (e.g., in rollback storage of management controller 112 used for storing a firmware payload and metadata of an update package installed through the management controller 112). If the image is present in the management controller, method 200 may proceed to step 206. Otherwise, method 200 may proceed to step 208.

At step 206, in response to the firmware image being present within a storage partition of the management controller 112, node cloning agent 114 may clone a firmware update image from the management controller 112, as described in greater detail below with reference to FIG. 3.

At step 208, node cloning agent 114 may determine if the information handling resource for which the firmware update is to be cloned is UEFI-compliant. If the device is UEFI-compliant, method 200 may proceed to step 210. Otherwise, method 200 may proceed to step 212.

At step 210, in response to the device being UEFI-compliant, node cloning agent 114 may clone a firmware update image via UEFI, as described in greater detail below with reference to FIG. 4.

At step 212, node cloning agent 114 may determine if the information handling resource for which the firmware update is to be cloned is PLDM-compliant. If the device is PLDM-compliant, method 200 may proceed to step 214. Otherwise, method 200 may proceed to step 216.

At step 214, in response to the device being PLDM-compliant, node cloning agent 114 may clone a firmware update image via PLDM, as described in greater detail below with reference to FIG. 5.

At step 216, node cloning agent 114 may clone a firmware update image from a remote repository, as described in greater detail below with reference to FIG. 6.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

Figure 3:
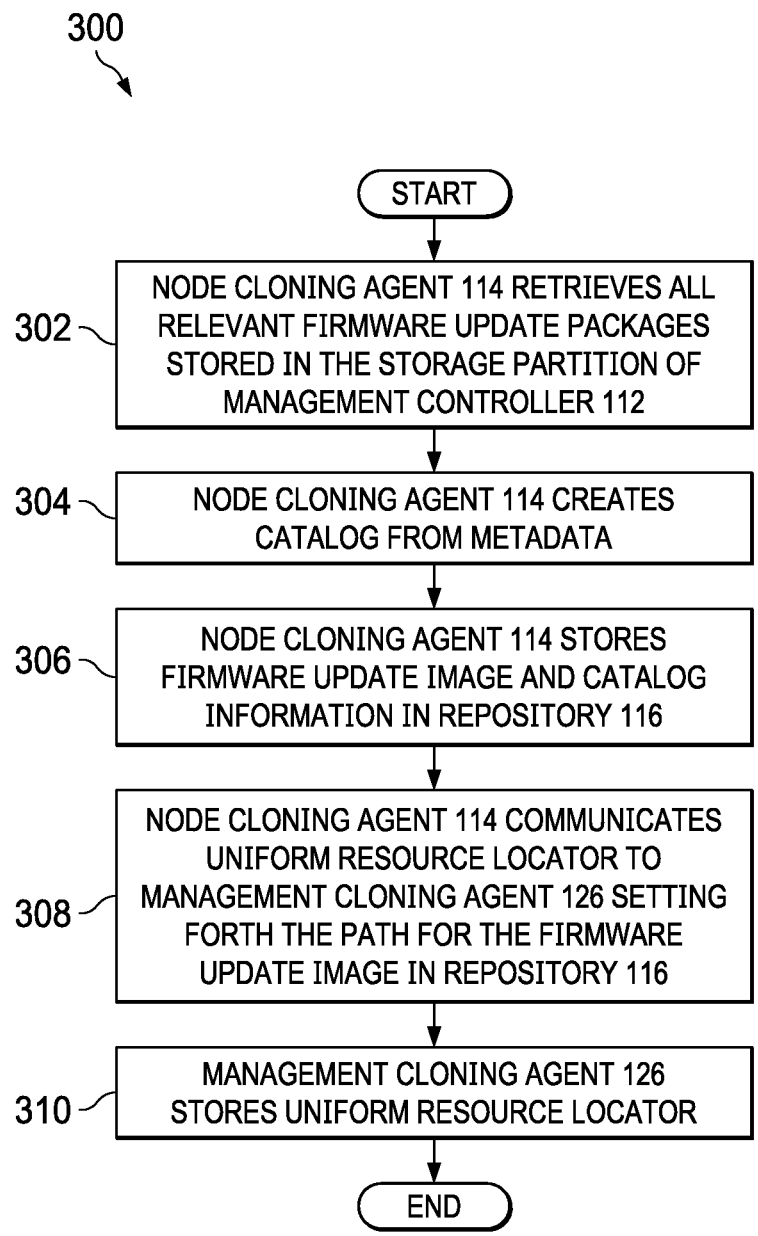
FIG. 3 illustrates a flowchart of an example method for cloning firmware updates from a management controller of a node of a cluster, in accordance with embodiments of the present disclosure.

FIG. 3 illustrates a flowchart of an example method 300 for cloning firmware updates from a management controller 112 of a node of a cluster, in accordance with embodiments of the present disclosure. According to certain embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, node cloning agent 114 may retrieve all relevant firmware update packages stored in the storage partition of management controller 112. Such retrieval may include extraction of metadata, such as firmware version, firmware name, etc. from a metadata file for the update package.

At step 304, node cloning agent 114 may create a catalog from the metadata, such that the catalog may include metadata information associated with each firmware update component. At step 306, node cloning agent 114 may store the firmware update image and catalog information in repository 116. At step 308, node cloning agent 114 may communicate a uniform resource locator to management cloning agent 126 setting forth the path for the firmware update image in repository 116. At step 310, management cloning agent 126 may store such uniform resource locator, which may be used to retrieve a firmware update image and perform a firmware update on an existing node or to provision firmware on a new node added to the cluster of system 100.

Although FIG. 3 discloses a particular number of steps to be taken with respect to method 300, it may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102, components thereof or any other system operable to implement method 300. In certain embodiments, method 300 may be implemented partially or fully in software and/or firmware embodied in computer-readable media.

Figure 4:
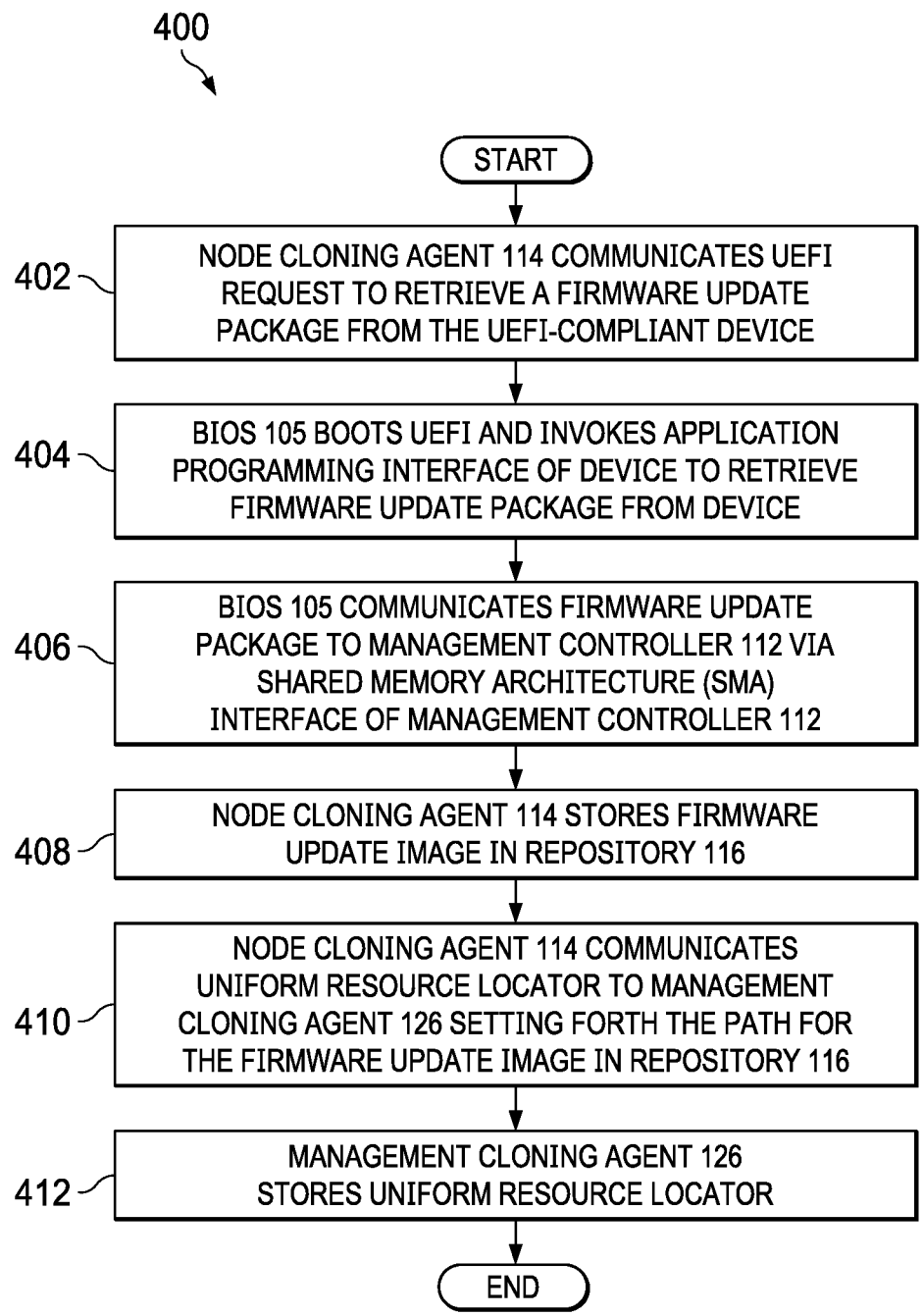
FIG. 4 illustrates a flowchart of an example method for cloning firmware updates using a management controller of a node of a cluster for a Unified Extensible Firmware Interface (UEFI)-compliant device, in accordance with embodiments of the present disclosure.

FIG. 4 illustrates a flowchart of an example method 400 for cloning firmware updates using a management controller 112 of a node of a cluster for a UEFI-compliant device, in accordance with embodiments of the present disclosure. According to certain embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, node cloning agent 114 may communicate a UEFI request to retrieve a firmware update package from the UEFI-compliant device. In response, at step 404, BIOS 105 may boot UEFI and invoke an application programming interface of the device to retrieve the firmware update package from the device. At step 406, BIOS 105 may communicate the firmware update package to management controller 112 via a Shared Memory Architecture (SMA) interface of the management controller 112.

At step 408, node cloning agent 114 may store the firmware update image in repository 116. At step 410, node cloning agent 114 may communicate a uniform resource locator to management cloning agent 126 setting forth the path for the firmware update image in repository 116. At step 412, management cloning agent 126 may store such uniform resource locator, which may be used to retrieve a firmware update image and perform a firmware update on an existing node or to provision firmware on a new node added to the cluster of system 100.

Although FIG. 4 discloses a particular number of steps to be taken with respect to method 400, it may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102, components thereof or any other system operable to implement method 400. In certain embodiments, method 400 may be implemented partially or fully in software and/or firmware embodied in computer-readable media.

Figure 5:
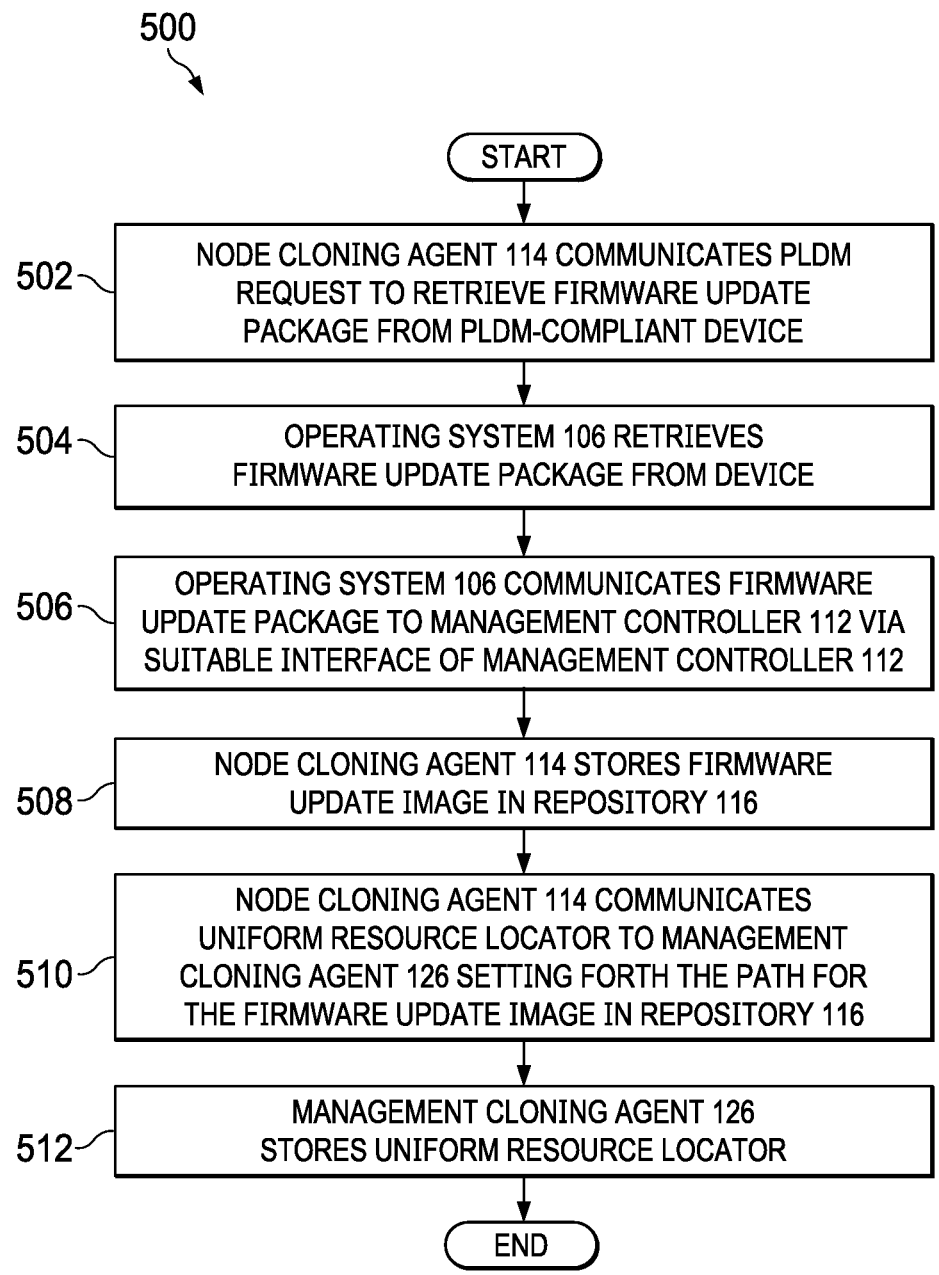
FIG. 5 illustrates a flowchart of an example method for cloning firmware updates using a management controller of a node of a cluster for a Platform Level Data Model (PLDM)-compliant device, in accordance with embodiments of the present disclosure.

FIG. 5 illustrates a flowchart of an example method 500 for cloning firmware updates using a management controller 112 of a node of a cluster for a PLDM-compliant device, in accordance with embodiments of the present disclosure. According to certain embodiments, method 400 may begin at step 502. As noted above, teachings of the present disclosure may be implemented in a variety of configurations of information handling system 102. As such, the preferred initialization point for method 500 and the order of the steps comprising method 500 may depend on the implementation chosen.

At step 502, node cloning agent 114 may communicate a PLDM request to retrieve a firmware update package from the PLDM-compliant device. In response, at step 504, operating system 106 may retrieve the firmware update package from the device. At step 506, operating system 106 may communicate the firmware update package to management controller 112 via a suitable interface of the management controller 112.

At step 508, node cloning agent 114 may store the firmware update image in repository 116. At step 510, node cloning agent 114 may communicate a uniform resource locator to management cloning agent 126 setting forth the path for the firmware update image in repository 116. At step 512, management cloning agent 126 may store such uniform resource locator, which may be used to retrieve a firmware update image and perform a firmware update on an existing node or to provision firmware on a new node added to the cluster of system 100.

Although FIG. 5 discloses a particular number of steps to be taken with respect to method 500, it may be executed with greater or fewer steps than those depicted in FIG. 5. In addition, although FIG. 5 discloses a certain order of steps to be taken with respect to method 500, the steps comprising method 500 may be completed in any suitable order.

Method 500 may be implemented using information handling system 102, components thereof or any other system operable to implement method 500. In certain embodiments, method 500 may be implemented partially or fully in software and/or firmware embodied in computer-readable media.

Figure 6:
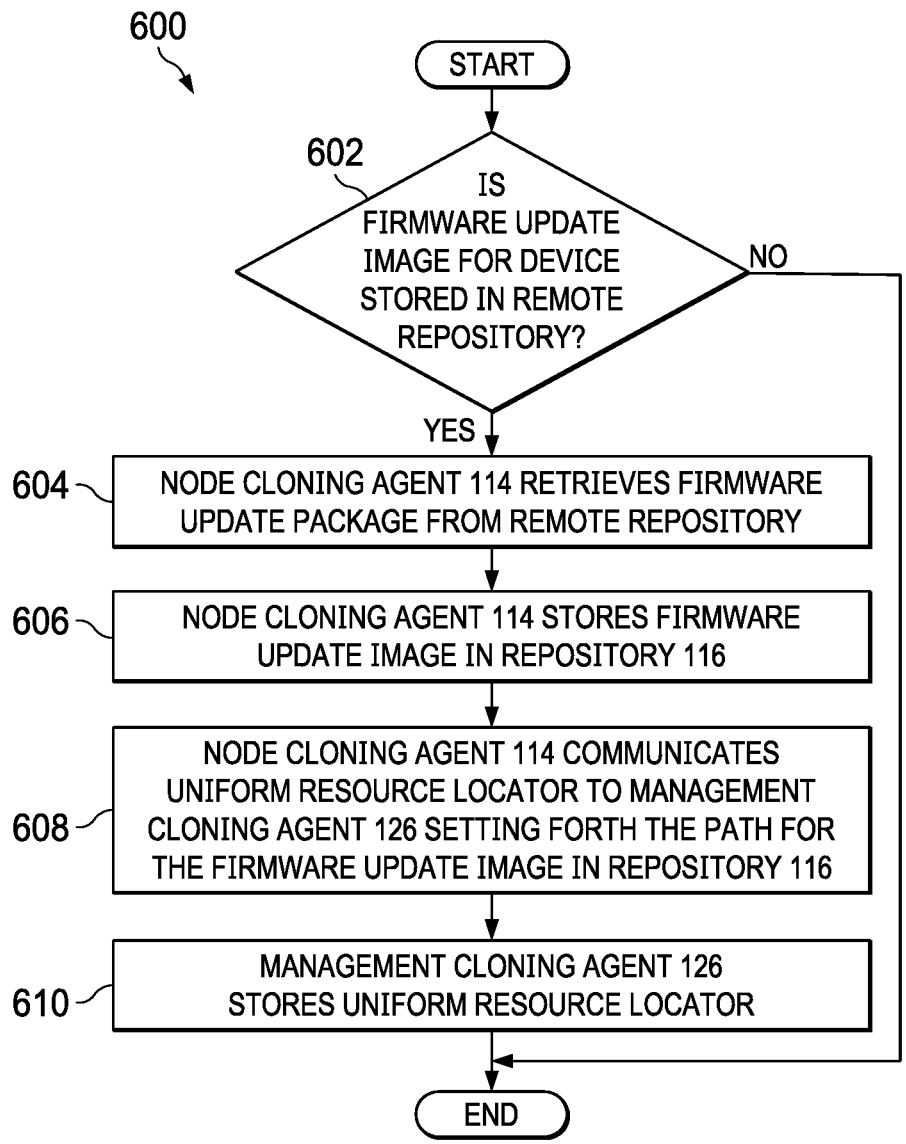
FIG. 6 illustrates a flowchart of an example method for cloning firmware updates using a management controller of a node of a cluster when firmware packages cannot be retrieved from the node, in accordance with embodiments of the present disclosure.

FIG. 6 illustrates a flowchart of an example method 600 for cloning firmware updates using a management controller 112 of a node of a cluster when firmware packages cannot be retrieved from the node, in accordance with embodiments of the present disclosure. According to certain embodiments, method 600 may begin at step 602. As noted above, teachings of the present disclosure may be implemented in a variety of configurations of information handling system 102. As such, the preferred initialization point for method 600 and the order of the steps comprising method 600 may depend on the implementation chosen.

At step 602, node cloning agent 114 may determine if the firmware update image for the device is stored in a repository, either online or offline, remote from information handling system 102. If the firmware update image for the device is stored in a remote repository, method 600 may proceed to step 604. Otherwise, method 600 may end.

At step 604, node cloning agent 114 may retrieve the firmware update package from the remote repository.

At step 606, node cloning agent 114 may store the firmware update image in repository 116. At step 608, node cloning agent 114 may communicate a uniform resource locator to management cloning agent 126 setting forth the path for the firmware update image in repository 116. At step 610, management cloning agent 126 may store such uniform resource locator, which may be used to retrieve a firmware update image and perform a firmware update on an existing node or to provision firmware on a new node added to the cluster of system 100.

Although FIG. 6 discloses a particular number of steps to be taken with respect to method 600, it may be executed with greater or fewer steps than those depicted in FIG. 6. In addition, although FIG. 6 discloses a certain order of steps to be taken with respect to method 600, the steps comprising method 600 may be completed in any suitable order.

Method 600 may be implemented using information handling system 102, components thereof or any other system operable to implement method 600. In certain embodiments, method 600 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system, comprising one of a plurality of information handling systems in a cluster, the information handling system comprising:
   a processor; and
   a management controller communicatively coupled to the processor and configured to perform out-of-band management of the information handling system, wherein performing out-of-band management includes:
   receiving a request from a remote management utility to create a firmware image for an item of firmware for the cluster; and
   responsive to receiving the request, performing operations including:
      retrieving a firmware update package;
      storing the firmware update package in a repository integral to the management controller; and
      enabling the remote management utility to access the firmware update package stored in the repository to perform a firmware update for another information handling system in the cluster, wherein said enabling includes communicating a uniform resource locator to the remote management utility, the uniform resource locator setting forth a path of the firmware update package within the repository.

2. The information handling system of claim 1, wherein the operations further include:
   determining if the firmware update package is stored in a storage partition of the management controller; and
   if the firmware update package is stored in the storage partition, retrieving the firmware update package from the storage partition.

3. The information handling system of claim 2, the operations further include:
   if the firmware update package is stored in the storage partition, creating a catalog of data from metadata stored in the storage partition and associated with the firmware update package; and
   storing the catalog in the repository.

4. The information handling system of claim 2, wherein the operations further include:
   if the firmware update package is absent from the storage partition, determining if an information handling resource associated with the firmware update package is Unified Extensible Firmware Interface (UEFI)-compliant; and
   if the information handling resource associated with the firmware update package is UEFI-compliant, causing a basic input/output system of the information handling system to invoke an application programming interface of the information handling resource to retrieve the firmware update package from the information handling resource associated with the firmware update package and communicate the firmware update package to the management controller.

5. The information handling system of claim 2, wherein the operations further include:
   if the firmware update package is absent from the storage partition, determining if an information handling resource associated with the firmware update package is Platform Level Data Model (PLDM)-compliant; and
   if the information handling resource associated with the firmware update package is PLDM-compliant, causing an operating system of the information handling system to invoke an application programming interface of the information handling resource to retrieve the firmware update package from the information handling resource associated with the firmware update package and communicate the firmware update package to the management controller.

6. The information handling system of claim 2, wherein the operations further include:
   if the firmware update package is absent from the storage partition, determining if the firmware update package is stored on a remote repository remote from the information handling system; and
   if the information handling resource associated with the firmware update package is stored on the remote repository, retrieving the firmware update package from the remote repository.

7. A firmware management method, the firmware management method comprising:
   receiving, by a management controller of an information handling system comprising one of a plurality of information handling systems in a cluster, a request from a remote management utility to create a firmware image for an item of firmware for the cluster; and
   responsive to receiving the request, performing operations including:
   retrieving a firmware update package;
   storing the firmware update package in a repository integral to the management controller; and
   enabling the remote management utility to access the firmware update package stored in the repository to perform a firmware update for another information handling system in the cluster, wherein said enabling includes communicating a uniform resource locator to the remote management utility, the uniform resource locator setting forth a path of the firmware update package within the repository.

8. The method of claim 7, wherein the operations further include:
   determining, by the management controller, if the firmware update package is stored in a storage partition of the management controller; and
   if the firmware update package is stored in the storage partition, retrieving, by the management controller, the firmware update package from the storage partition.

9. The method of claim 8, wherein the operations further include:
   if the firmware update package is stored in the storage partition, creating, by the management controller, a catalog of data from metadata stored in the storage partition and associated with the firmware update package; and
   storing, by the management controller, the catalog in the repository.

10. The method of claim 8, wherein the operations further include:
    if the firmware update package is absent from the storage partition, determining, by the management controller, if an information handling resource associated with the firmware update package is Unified Extensible Firmware Interface (UEFI)-compliant; and
    if the information handling resource associated with the firmware update package is UEFI-compliant, causing, by the management controller, a basic input/output system of the information handling system to invoke an application programming interface of the information handling resource to retrieve the firmware update package from the information handling resource associated with the firmware update package and communicate the firmware update package to the management controller.

11. The method of claim 8, wherein the operations further include:
    if the firmware update package is absent from the storage partition, determining, by the management controller, if an information handling resource associated with the firmware update package is Platform Level Data Model (PLDM)-compliant; and
    if the information handling resource associated with the firmware update package is PLDM-compliant, causing, by the management controller, an operating system of the information handling system to invoke an application programming interface of the information handling resource to retrieve the firmware update package from the information handling resource associated with the firmware update package and communicate the firmware update package to the management controller.

12. The method of claim 8, wherein the operations further include:
    if the firmware update package is absent from the storage partition, determining, by the management controller, if the firmware update package is stored on a remote repository remote from the information handling system; and if the information handling resource associated with the firmware update package is stored on the remote repository, retrieving, by the management controller, the firmware update package from the remote repository.

13. An article of manufacture comprising:

a non-transitory computer-readable medium; and computer-executable instructions carried on the non-transitory computer-readable medium, the instructions, when read and executed by a processor of a management controller configured to perform out-of-band management of an information handling system comprising one of a plurality of information handling systems in a cluster, cause the management controller to perform operations including:

receiving a request from a remote management utility to create a firmware image for an item of firmware for the cluster; and responsive to receiving the request, performing operations including:
retrieving a firmware update package;
storing the firmware update package in a repository integral to the management controller; and
enabling the remote management utility to access the firmware update package stored in the repository to perform a firmware update for another information handling system in the cluster, wherein said enabling includes communicating a uniform resource locator to the remote management utility, the uniform resource locator setting forth a path of the firmware update package within the repository.

14. The article of manufacture of claim 13, the operations further including:
determine if the firmware update package is stored in a storage partition of the management controller; and
if the firmware update package is stored in the storage partition, retrieve the firmware update package from the storage partition.

15. The article of manufacture of claim 14, the operations further including:
if the firmware update package is stored in the storage partition, creating a catalog of data from metadata stored in the storage partition and associated with the firmware update package; and
storing the catalog in the repository.

16. The article of manufacture of claim 14, the operations further including:
if the firmware update package is absent from the storage partition, determining if an information handling resource associated with the firmware update package is Unified Extensible Firmware Interface (UEFI)-compliant; and
if the information handling resource associated with the firmware update package is UEFI-compliant, causing a basic input/output system of the information handling system to invoke an application programming interface of the information handling resource to retrieve the firmware update package from the information handling resource associated with the firmware update package and communicate the firmware update package to the management controller.

17. The article of manufacture of claim 14, the operations further including:
if the firmware update package is absent from the storage partition, determining if an information handling resource associated with the firmware update package is Platform Level Data Model (PLDM)-compliant; and
if the information handling resource associated with the firmware update package is PLDM-compliant, causing an operating system of the information handling system to invoke an application programming interface of the information handling resource to retrieve the firmware update package from the information handling resource associated with the firmware update package and communicate the firmware update package to the management controller.

18. The article of manufacture of claim 14, the operations further including:
if the firmware update package is absent from the storage partition, determining if the firmware update package is stored on a remote repository remote from the information handling system; and
if the information handling resource associated with the firmware update package is stored on the remote repository, retrieving the firmware update package from the remote repository.

* * * * *